(12) United States Patent
Littleton et al.

(10) Patent No.: US 6,179,605 B1
(45) Date of Patent: Jan. 30, 2001

(54) ROTARY INJECTION MOLD

(75) Inventors: Jeffrey E. Littleton, Remlap; Harry E. Littleton, Pinson, both of AL (US)

(73) Assignee: C & L Plastics, Inc., Pinson, AL (US)

( * ) Notice: Under 35 U.S.C. 154(b), the term of this patent shall be extended for 0 days.

(21) Appl. No.: 09/190,065

(22) Filed: Nov. 12, 1998

(51) Int. Cl.$^7$ .................................................. B29C 45/04
(52) U.S. Cl. ......................... 425/547; 425/552; 425/572; 425/576
(58) Field of Search ................................. 425/130, 572, 425/573, 576, 540, 547, 552

(56) References Cited

U.S. PATENT DOCUMENTS

| | | | |
|---|---|---|---|
| 4,345,892 | * 8/1982 | Schulte et al. | 425/572 |
| 4,652,227 | * 3/1987 | Aoki | 425/540 |
| 5,686,122 | * 11/1997 | Huntington et al. | 425/552 |

OTHER PUBLICATIONS

Rosato & Rosato, Injection Molding Handbook, pp. 295 and 318, 1995.*

* cited by examiner

Primary Examiner—Tim Heitbrink
(74) Attorney, Agent, or Firm—Robert J. Veal; Christopher A. Holland; Burr & Forman, LLP

(57) ABSTRACT

A machine for injection molding of plastic articles comprising a rotatable wheel having a plurality of molds mounted along the periphery thereof with spacers mounted therebetween, wherein each mold comprises two opposing sections pivotally attached to each other such that the mold opens radially towards the periphery of the wheel. The periphery of the molds and spacers are machined to a precise radius to collectively form a continuous circle. Each mold comprises a plurality of cavities wherein each cavity communicates with the exterior of the mold along the periphery thereof through an opening formed at the mold parting line. A stationary injection nozzle is machined to precisely conform to the periphery of the circular structure and to ride along the surface thereof as the wheel is rotated. The nozzle comprises at least one port for each of the cavity openings in a single mold, wherein the nozzle is designed to convey pressurized molten plastic from a plastic fusion chamber and inject the molten plastic directly into each of the mold cavities simultaneously through the cavity openings. The temperature of the nozzle is preferably regulated by a thermocouple driven temperature controller so that the plastic can be cooled within the nozzle from the elevated temperatures required for fusion to a temperature adequate for injection. The machine further comprises an automated mold recycling feature which opens each mold, extracts the plastic articles therefrom, and closes the mold for reuse. The extracted articles are collected and processed for shipping.

35 Claims, 11 Drawing Sheets

ROTARY INJECTION MOLD

FIELD OF THE INVENTION

The present invention relates to injection molding of plastic articles. More particularly, the present invention relates to an improved injection molding system comprising a rotary mold and injection nozzle for use therewith.

BACKGROUND OF THE INVENTION

In the art of injection molding plastic fishing lures, large presses (pneumatic or hydraulic) are typically used for molding rigid plastics, such as polystyrene and polypropylene, and smaller presses are typically used for molding flexible plastics, such as plasticized polyvinyl chloride (PVC). Flexible plastics allow the use of smaller presses due to the reduced injection pressures associated therewith. For example, typical injection pressures of at least 5000 psig are associated with injection molding of rigid plastics and typical injection pressures for flexible plastics seldom exceed 50 psig. Prior art presses normally comprise a stationary platen and a moving platen, each of which has an opposing mold section rigidly attached thereto. Clamping the mold sections together to withstand injection pressures is typically accomplished with a pneumatic or hydraulic cylinder, which forces the moving platen against the stationary platen. Precise alignment between the platens is governed by bushings that guide movement of the moving platen.

Injection molds have been designed in various shapes and sizes, with the most common design having rectangular-shaped opposing plates with a thickness between ¾ to 1 inch, wherein the upper plate is known as a "cope" and the lower plate is known as a "drag". The two mold sections typically have multiple opposing cavities communicating with a common runner through which plastic is fed into the mold cavities. The connection between a runner and a mold cavity is known as a "gate", which is typically narrowed to facilitate removal of a lure from its associated runner. The gate should be sized to allow continuous feeding of plastic through the gate as the plastic within the mold cavity cools. Otherwise, the lure will "shrink" as it cools, a defect which manifests as an indention, usually located in the thickest portion of the lure.

In recent years, the trend in the flexible plastic lure industry has been to use larger presses and larger molds having more cavities in an attempt to reduce manufacturing costs. This trend has resulted in significant changes to operational procedures to facilitate flowing plastic longer distances through the mold. For example, in a large mold having numerous cavities, the plastic filling the first cavities will be much hotter than the plastic filling the last cavities because the plastic is cooled as it flows through the long runners. A problem that has arisen with the larger molds is that as the plastic temperature decreases across the runner/cavity system, the viscosity of the plastic increases, creating a viscosity gradient. This viscosity gradient increases the difficulty of producing quality lures, especially in a lamination process wherein two different colored plastics are required to flow side-by-side. Viscosity is the primary physical property which dictates the flowability of plastics. Thus, to assure complete filling of all mold cavities, the plastic must be heated to a higher temperature than would be required for a mold having a small number of cavities.

Injection machines have been utilized for molding plastic articles comprising a single color, two colors wherein the lure body is one color and the lure tail is another, two colors wherein the inner portion of the lure is one color and the outer portion is another (known as "cored"), and two (or more) colors side-by-side along the length of the lure via a lamination process. The term "lamination" stems from fluid mechanics wherein a laminar flow occurs whenever part of a flowing fluid remains fixed in position relative to an adjacent flowing fluid and moves in a predictable linear fashion. Viscosity control of the two plastic flows is critical to start and maintain a laminar flow.

The technology of producing single colored, multi-colored, cored, and laminated lures is dependent on the plastic flow control devices incorporated into the mold design and/or the injection nozzle. Two-colored lures are typically injected in a manner such that the body of the lure will be one color and the tail another color. Cored lures typically exhibit a transparent color on the surface with a contrasting color inside. In the past few years, the lamination process has overwhelmed the industry in popularity due to its success in the market. During a typical lamination process, two streams of plastic having different colors are flowed side-by-side into each lure cavity. Laminations with two colors can be achieved through mechanical flow separators, such as mold runner flappers or stripper bars.

Mold runner flappers serve to start the two colored plastics into a runner in a laminar flow; however, maintaining laminar flow in large molds is difficult due to the temperature/viscosity gradients previously discussed. The mold runner flappers typically render the resulting plastic runner unsuitable for recycling because of mixing of the two colors of plastic, which increases material wastes and the cost of lure manufacturing. Other shortcomings in the mold runner flapper design include poor color separation control resulting in intermixing of the plastics and, therefore, a poor quality lamination; and this design is impracticable for laminations normal to the mold parting line.

The stripper bar design, taught in U.S. Pat. No. 4,969,811, was an effort to overcome the shortcomings of other lamination techniques. The stripper bar design maintains separate runners for each of the two colored plastics and delivers them to the gate of each lure cavity. Flow into each cavity is controlled by indexing the stripper bar after the runner cavities are fill to expose the stripper bar ports to each lure cavity. Although some mixing of the two plastics may occur near the gates, the stripper bar yields quality laminated lures at reduced manufacturing costs. Nonetheless, a limitation of the stripper bar, as well as other lamination techniques, is that orientation of the lamination is limited to having the color separation plane coincident with the mold parting line.

One particularly demanding innovation has been lamination normal to the mold parting line (vertical lamination). Vertical lamination produces a lure having one color on its top (back) and another color on its bottom (belly). In most cases, a mold cavity cannot be arranged within the mold to allow vertical lamination due to undercuts which preclude normal casting or machining operations for mold making. For many years, a vertical lamination effect was accomplished by spray painting the back of the lures with a compatible paint. The additional manufacturing operations were costly and involved handling of flammable and toxic solvents. Several years ago, the stripper bar was redesigned to allow vertical laminations. Nonetheless, shortcomings of the stripper bar design are approximately 50% of the runners are unsuitable for recycling due to intermixing of the plastics near the cavity gate and maintaining laminar flow in large molds.

Other shortcomings seen in prior art designs include: (1) separate molds are required for single color, two color, cored, and lamination processes; (2) horizontal mold parting line presses do not provide a natural escape path for air inside the mold cavities as the cavities are filled with plastic, resulting in trapped air pockets along the top surface of each plastic lure; (3) each injection molding machine requires an operator to remove plastic runners and attached lures from the mold before the mold can be recycled; (4) additional labor is required to detach the individual lures from the associated runners and package the lures for shipment and/or further processing; (5) runners are either discarded, thus increasing material waste, or separated according to color and recycled, thus requiring additional labor; and (6) production cycle time is dependent on the size of the individual mold cavities and the volume of plastic injected therein because of the time required for the plastic to cool sufficiently to maintain its shape when removed from the mold cavity. Since the heat conduction rate through plastic is much lower than through the mold, which is typically comprised of aluminum, the plastic cooling period controls the cycle time. For example, when the lure is removed from the mold cavity, only the outside skin of the lure has typically been cooled. If the plastic is not allowed to sufficiently cool, the residual heat inside the lure can reheat the entire lure, making the lure receptive to deformation. Typical cycle times for injection molding machines are from 50 seconds for small lures to 200 seconds for large lures.

As can be seen from the foregoing, there remains a need for improved methods and machines for injection molding of plastic lures.

SUMMARY OF THE PRESENT INVENTION

It is an object of the present invention to provide a fully automated injection molding machine, thus reducing manufacturing costs associated with human labor.

It is another object of the present invention to eliminate mold runners from the injection process, thus reducing manufacturing costs associated with material waste.

It is another object of the present invention to provide automated extraction of plastic articles from the mold cavities such that the molds may be quickly recycled for reuse without human intervention.

It is another object of the present invention to provide an injection molding machine capable of producing single or multi-colored plastic articles without changing molds.

It is another object of the present invention to provide an injection molding machine having interchangeable mold segments such that a variety of plastic article designs can be produced simultaneously.

It is another object of the present invention to optimize the cooling period of injected plastic articles without sacrificing production time such that the plastic articles are sufficiently cooled throughout to prevent deformation during or after extraction from the mold.

It is another object of the present invention to substantially increase the rate of plastic article production over existing injection molding machines.

It is another object of the present invention to provide an injection nozzle assembly designed to inject molten plastic directly into each mold cavity simultaneously.

It is another object of the present invention to provide an injection nozzle assembly designed to cool molten plastic from elevated fusion temperatures to temperatures adequate for injection to optimize the rate of plastic article production and improve the quality of multi-colored products.

It is another object of the present invention to provide an injection nozzle assembly designed for rapid change from laminar injection along the mold parting line to laminar injection normal to the mold parting line.

It is another object of the present invention to provide an injection nozzle assembly designed to accommodate molds having different cavity spacing.

These and other objects of the present invention are accomplished with a machine for injection molding of plastic articles comprising a rotatable wheel having a plurality of molds mounted along the periphery thereof with spacers mounted therebetween, wherein each mold comprises two opposing sections pivotally attached to each other such that the mold opens radially towards the periphery of the wheel. The periphery of the molds and spacers are machined to a precise radius to collectively form a continuous circle. The wheel and attached molds and spacers are supported on a rotatable shaft mounted at each end on a support frame. Each mold comprises a plurality of cavities wherein each cavity communicates with the exterior of the mold along the periphery thereof through an opening ("gate") formed at the mold parting line, wherein the length of the opening is preferably between about 0.010 to about 0.015 inch and the diameter is preferably between about 0.0625 to about 0.125 inch.

A stationary injection nozzle is machined to precisely conform to the periphery of the circular structure and to ride along the surface thereof as the wheel is rotated. The nozzle comprises at least one port corresponding to each of the cavity openings in a single mold, wherein the nozzle is designed to convey pressurized molten plastic from a plastic fusion chamber and inject the molten plastic directly into each of the mold cavities simultaneously through the cavity openings. The temperature of the nozzle is preferably regulated by a thermocouple driven temperature controller so that the plastic can be cooled within the nozzle from the elevated temperatures required for fusion to a temperature adequate for injection. This intercooling feature, along with the short travel distance between the nozzle and mold cavities, allows precise viscosity control of plastics. A thin Teflon sheet having ports aligned with the mold gates serves to insulate the nozzle from the molds and to cut each plastic article at its respective gate. The machine further comprises an automated mold recycling feature which opens each mold, extracts the plastic articles therefrom, and closes the mold for reuse. The extracted articles are collected and processed for shipping.

These and other objects and advantages of the invention will become apparent from the following detailed description of the preferred embodiment of the invention.

BRIEF DESCRIPTION OF THE DRAWINGS

A rotary mold injection machine embodying features of the invention is described in the accompanying drawings which form a portion of this disclosure and wherein.

DETAILED DESCRIPTION OF THE PREFERRED EMBODIMENT

Figure 1:
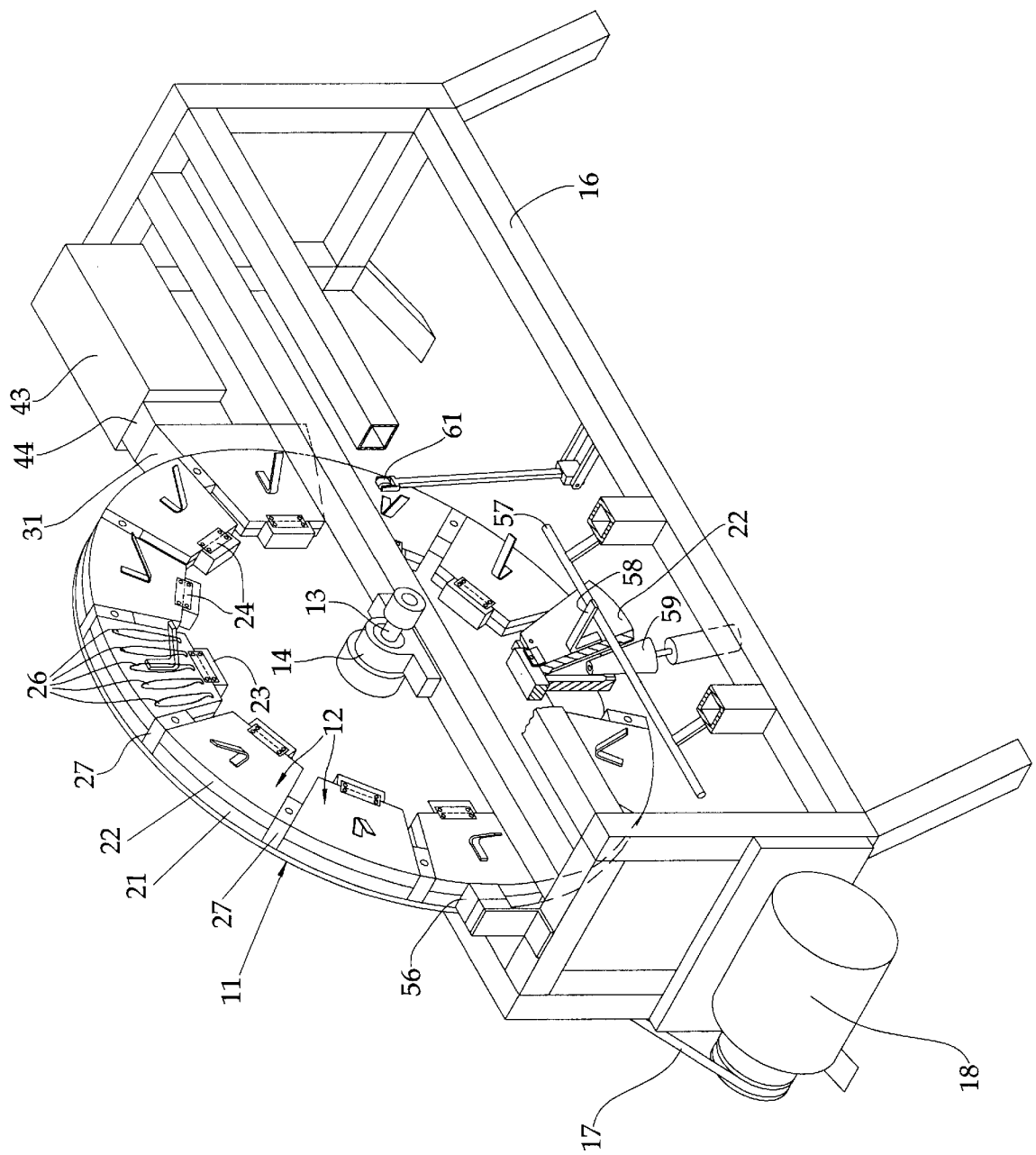
FIG. 1 is a perspective view of the preferred embodiment of the present invention.
Figure 2:
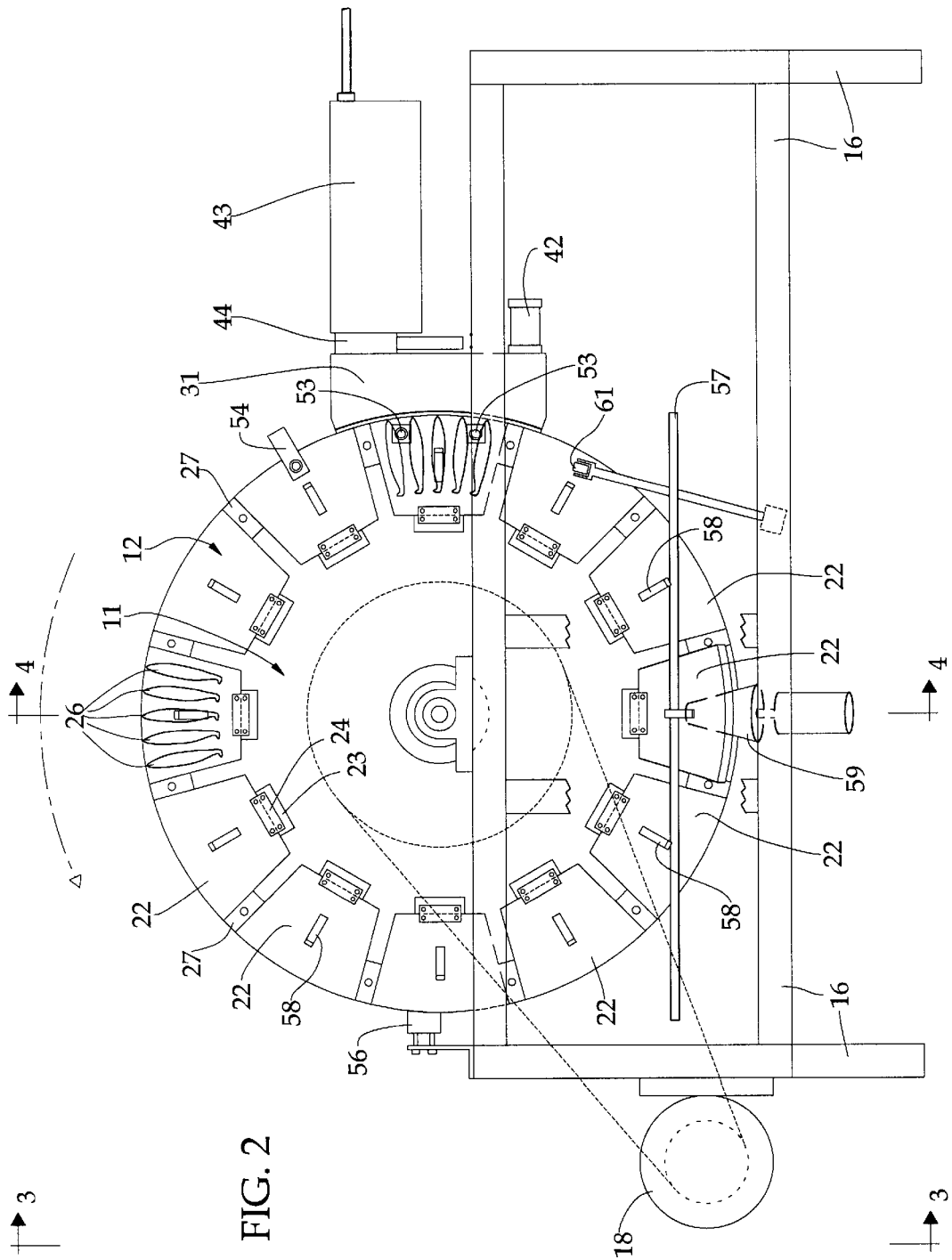
FIG. 2 is a front view of the present invention.
Figure 4:
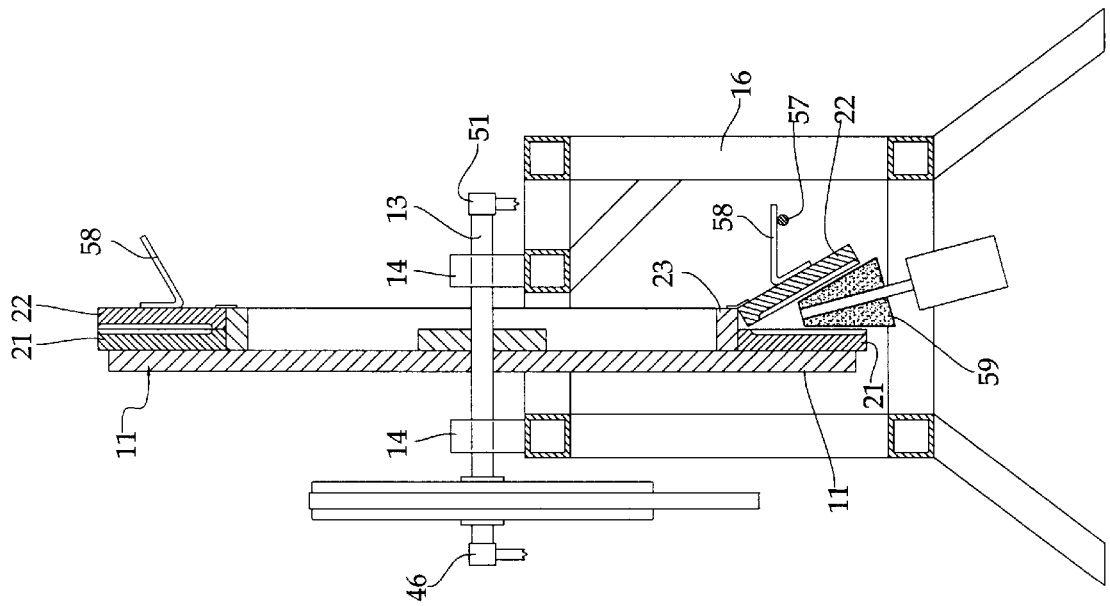
FIG. 4 is a sectional view of the present invention taken along line 4—4 of FIG. 2.
Figure 3:
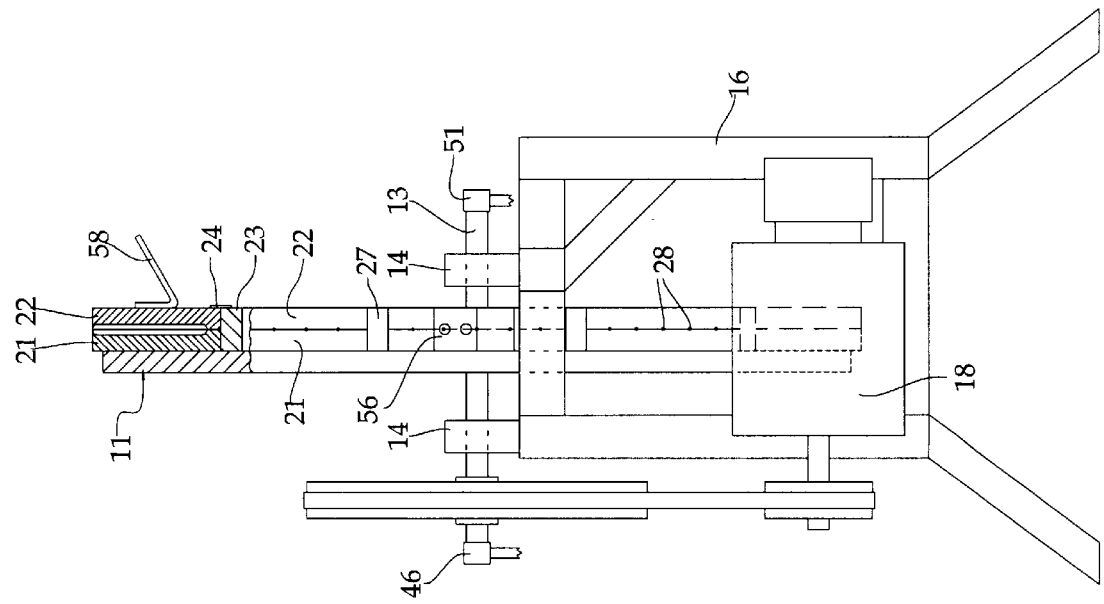
FIG. 3 is a side view of the present invention taken along line 3—3 of FIG. 2.
Figure 5:
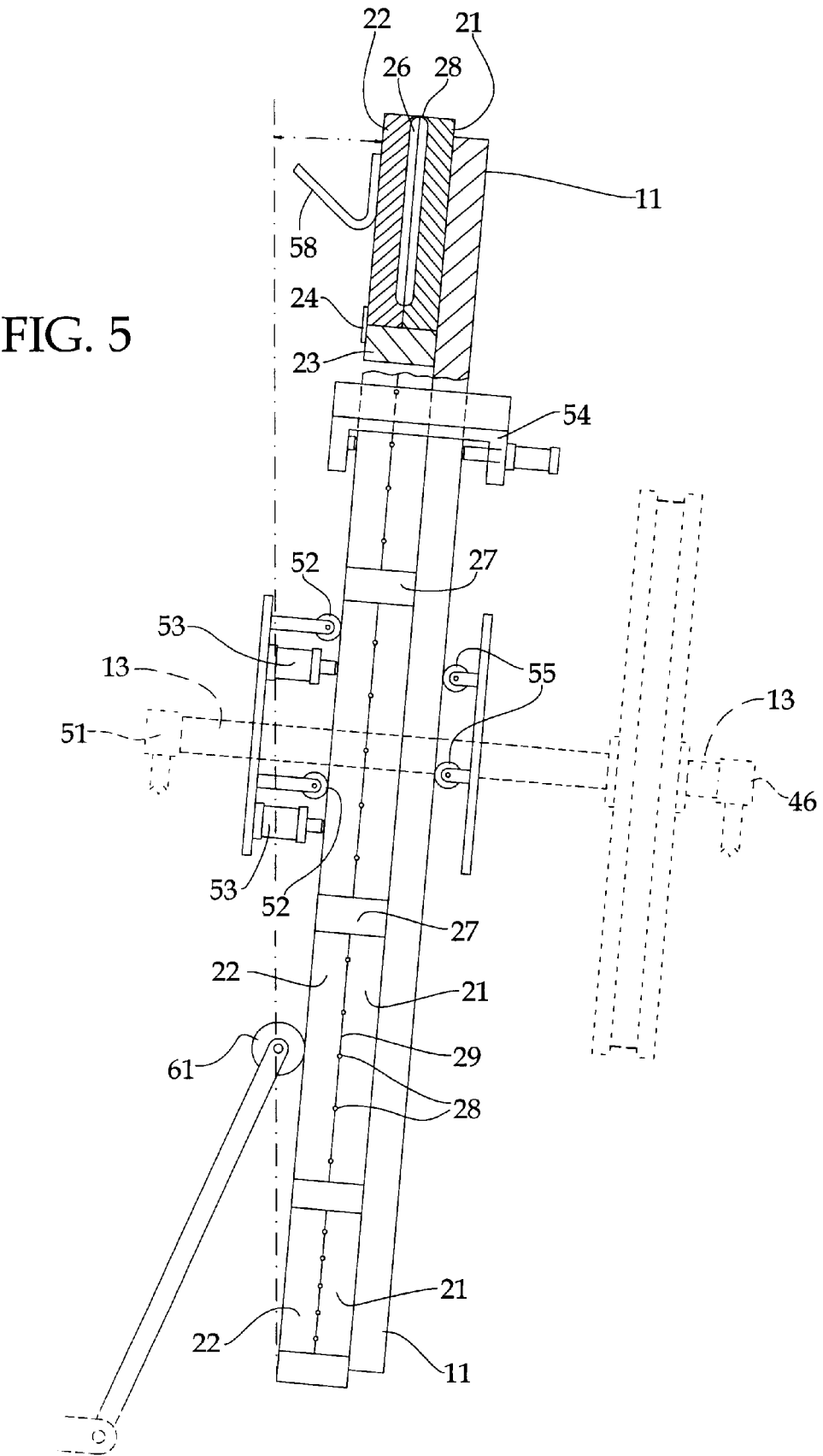
FIG. 5 is a side view of the rotatable wheel with attached molds in an offset orientation.
Figure 6:
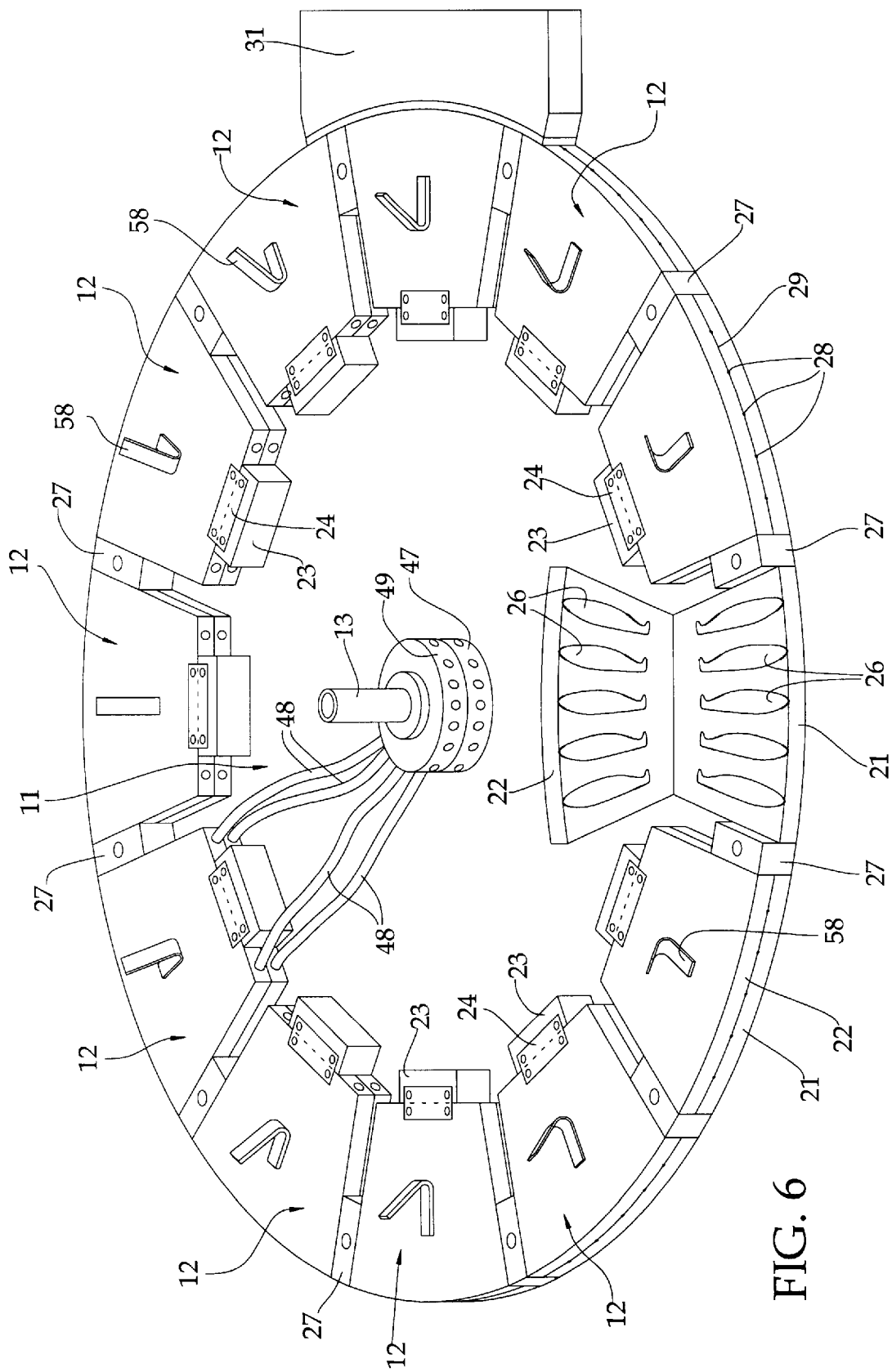
FIG. 6 is a perspective view of the rotatable wheel with attached molds and injection nozzle of the present invention.

A more complete understanding of the invention may be obtained by reference to the accompanying drawings wherein the machine, according to the preferred embodiment, comprises a rotatable wheel 11 having a plurality of molds 12 mounted along the periphery thereof. Wheel 11 preferably has a diameter of about 36 inches with twelve molds 12 mounted thereto; however, the wheel may have any reasonable diameter or number of molds. Wheel 11 and molds 12 are preferably comprised of a highly conductive metal, such as aluminum. Wheel 11 is supported on a rotatable hollow shaft 13 mounted for rotation at each end in pillow block bearings 14, wherein shaft 13 and bearings 14 are supported on a support frame 16. Rotation of wheel 11 is controlled by a V-belt pulley 17 driven by a gear reduction motor 18 equipped with a mechanical brake. Wheel 11 is preferably offset between 0–20 degrees from the vertical plane, and most preferably between 5–10 degrees, to promote closure of the molds by gravity. This offset feature, illustrated in FIG. 5, can be accomplished by either mounting wheel 11 to support frame 16 such that wheel 11 is offset from the vertical plane or adjusting support frame 16 such that the entire machine is offset.

Each mold 12 comprises two opposing sections, a stationary section 21 which is affixed to wheel 11 along the periphery thereof and an opposing movable section 22 which is pivotally attached to an adjustable stop 23 by a hinge 24. Each mold section 21, 22 is preferably about 0.75 inch thick and has a shape of a truncated cone with the mold sections pivotally attached at the truncated edge so that mold 12 opens radially towards the periphery of wheel 11. Each mold 12 preferably comprises between five and twelve cavities 26, depending on the desired lure size, with a portion of each cavity 26 formed in each mold section 21, 22. Cavities 26 can be coated with an anti-stick material (not shown) to inhibit adherence of injected plastic. Adjustable stop 23 is radially adjustable on wheel 11 to accommodate different mold lengths. Molds 12 are separated from one another on wheel 11 by machined spacers 27 affixed to the wheel, wherein spacers 27 serve to provide precise positioning of each mold 12 during installation, guide movable mold sections 22 as they open and close, and provide adequate separation between molds 12 for unobstructed opening and closing of movable mold sections 22. The periphery of molds 12 and spacers 27 are machined to a precise radius to collectively form a continuous circle, preferably extending approximately 0.5 inch beyond the periphery of wheel 11. The periphery of each mold section 21, 22 is preferably machined to a distance between about 0.010 to about 0.015 inch from mold cavities 26. A plurality of openings 28, or gates, are formed along a mold parting line 29 between mold cavities 26 and the periphery of mold 12, each opening 28 having a preferred diameter between about 0.0625 to about 0.125 inch.

Figure 7:
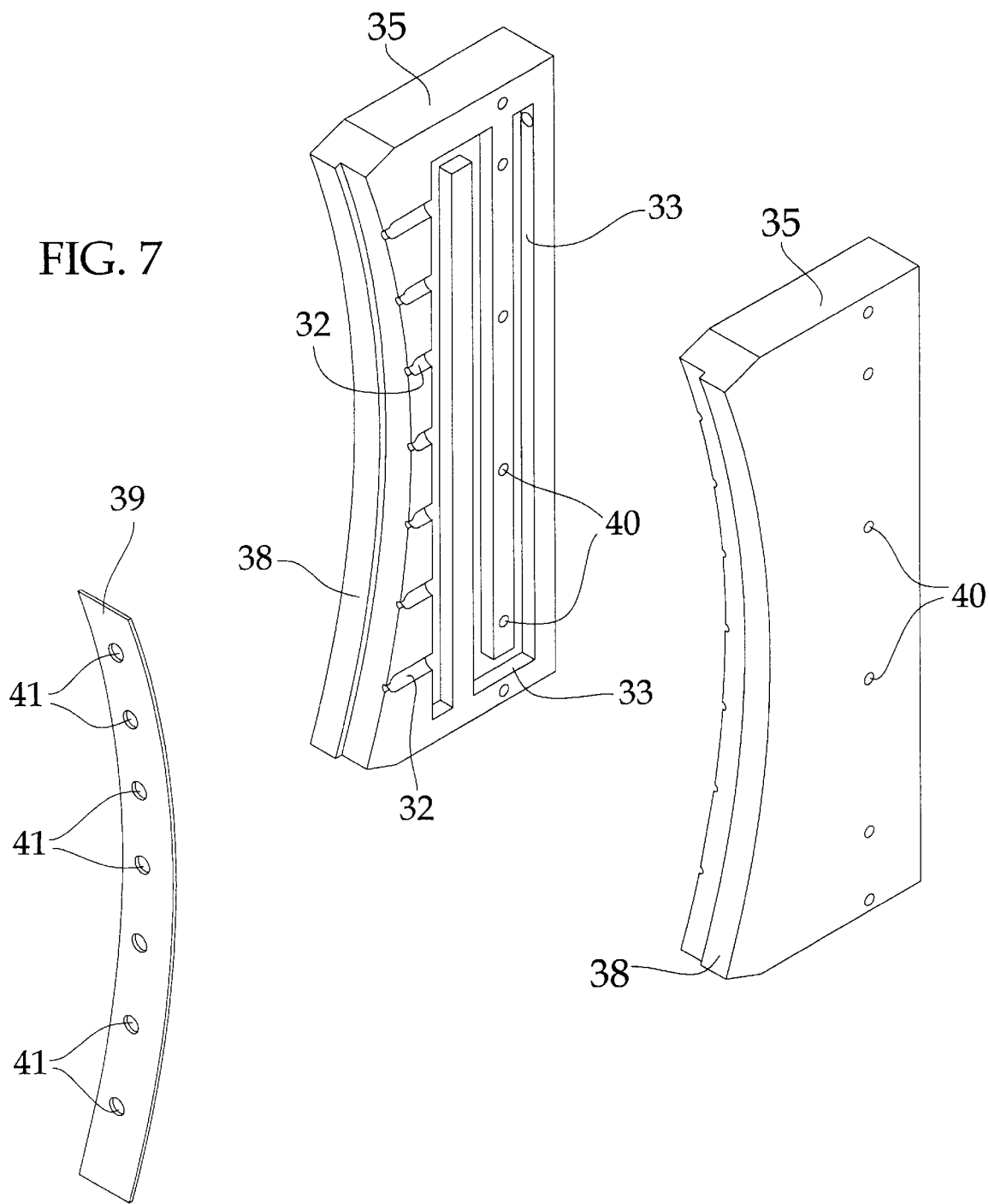
FIG. 7 is an exploded perspective view of the injection nozzle.

Injection of plastic into mold cavities 26 is accomplished through an injection nozzle 31 machined to precisely conform to the periphery of molds 12 and spacers 27 and to ride along the surfaces thereof, wherein the nozzle preferably comprises a conductive metal such as aluminum. Nozzle 31 preferably comprises two opposing members 35, illustrated in FIG. 7, which are juxtaposed to form a plurality of injection ports 32 connecting a channel system 33 to the exterior of nozzle 31 for injection of molten plastic into mold cavities 26, wherein nozzle 31 has at least one port 32 corresponding to each opening 28 in a single mold 12. This nozzle embodiment is useful for injection molding single-colored plastic articles.

Figure 8:
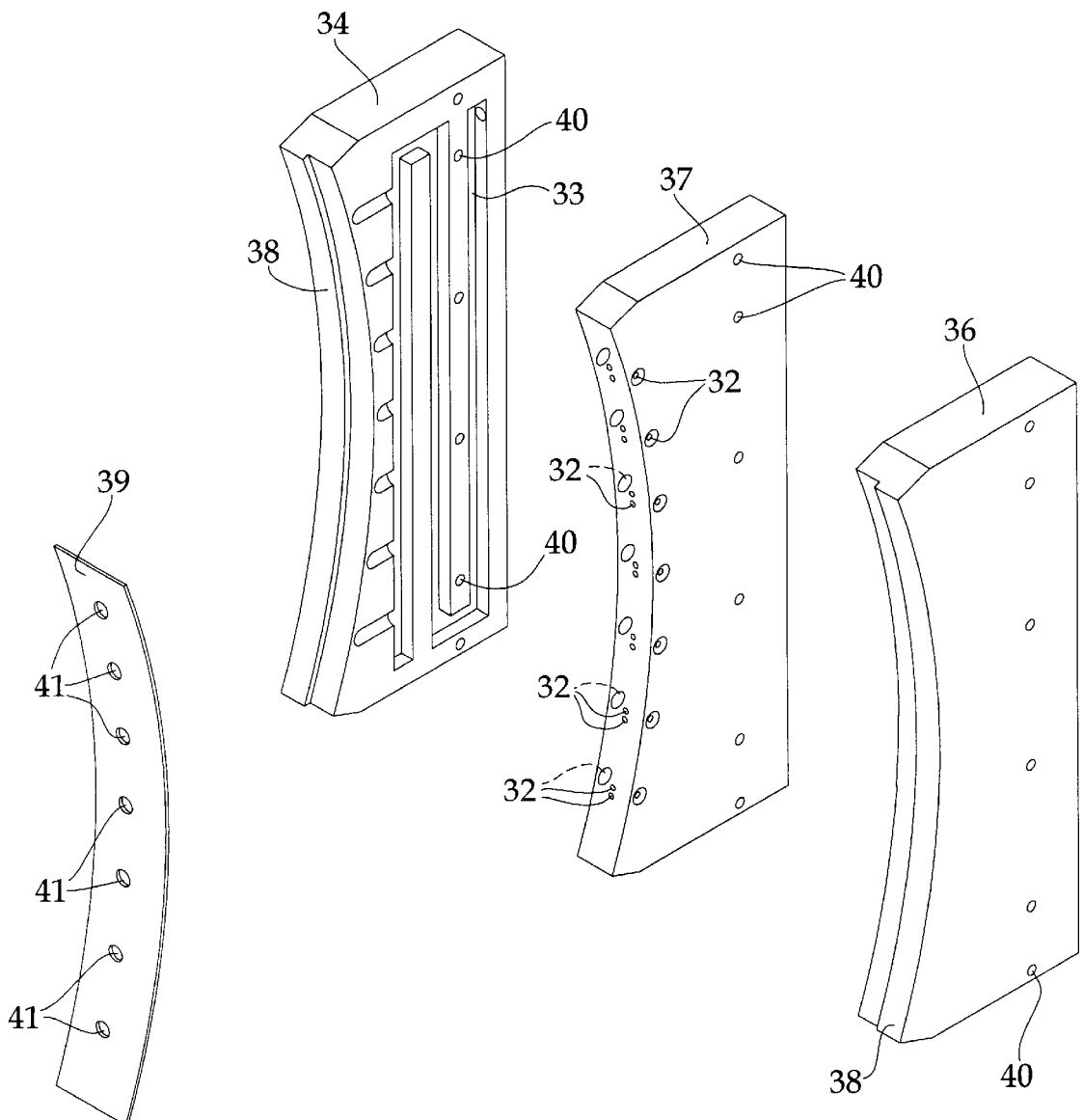
FIG. 8 is an exploded perspective view of an alternate embodiment of the injection nozzle.
Figure 9:
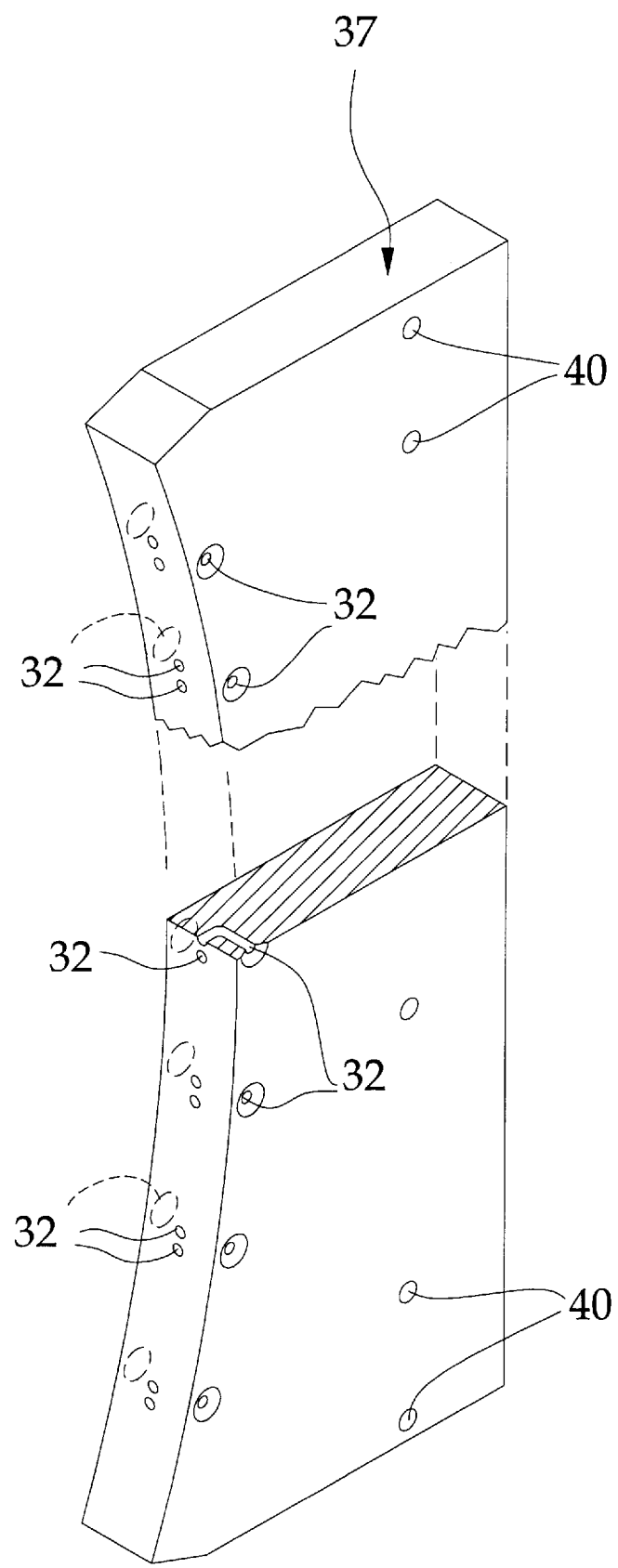
FIG. 9 is a perspective view, partially in section, of the central member of the injection nozzle of FIG. 8.

In an alternate embodiment shown in FIGS. 8 and 9, nozzle 31 comprises three members, two outer members 34, 36, each of which comprises a channel system 33 through which molten plastic flows, and a central member 37 between outer members 34, 36. Central member 37 serves to separate plastic flows within outer members 34, 36, for example, where two different colored plastics are used. Central member 37 comprises a plurality of injection ports 32 connecting channel systems 33 to the exterior of nozzle 31 for injection of molten plastic into mold cavities 26, wherein central member 37 has at least two ports 32 for each opening 28 in a single mold 12.

Figure 12:
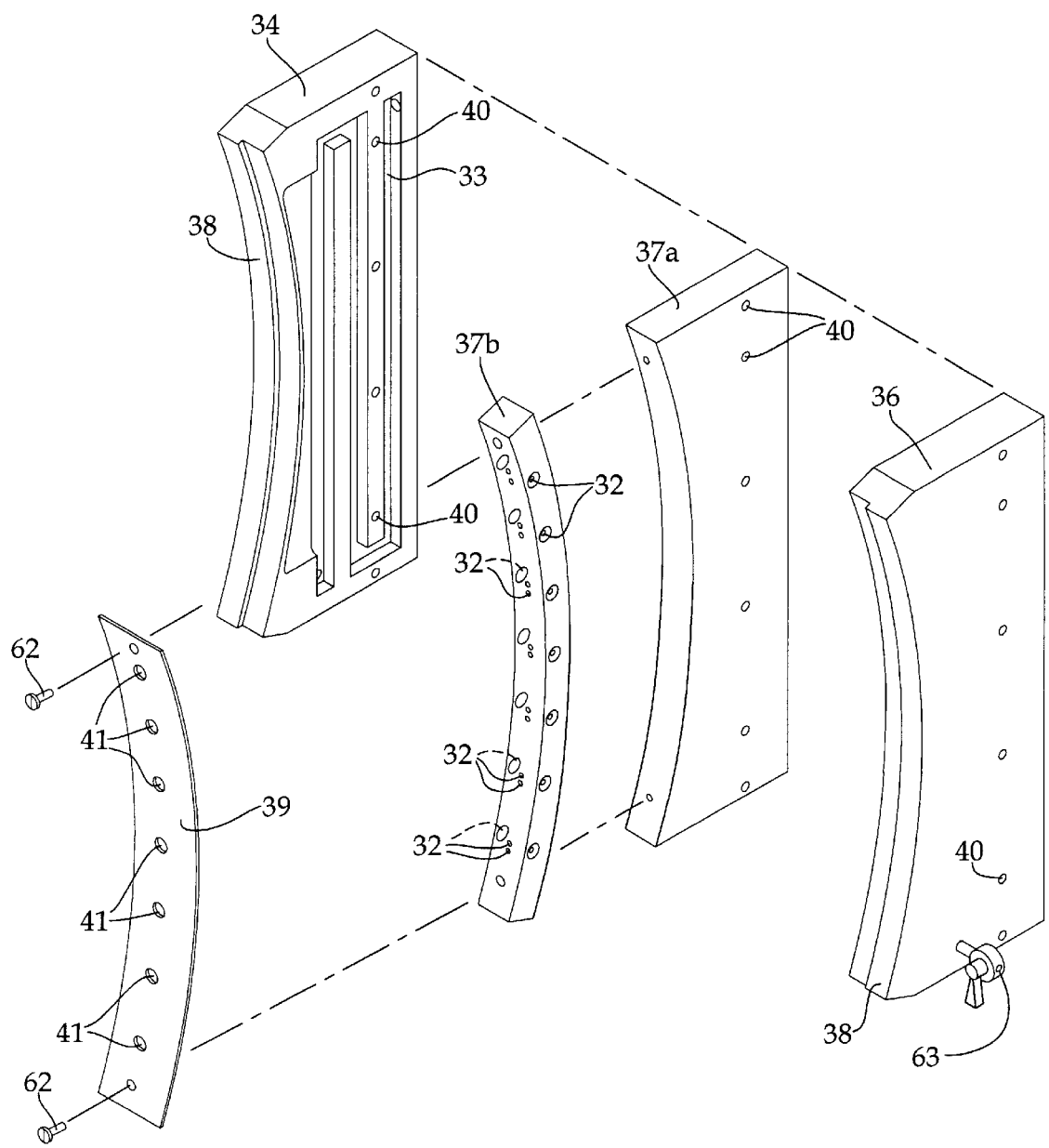
FIG. 12 is an exploded perspective view of an alternate embodiment of the injection nozzle.

In another alternate embodiment shown in FIG. 12, nozzle 31 comprises four members, two outer members 34, 36, each of which comprises a channel system 33 through which molten plastic flows, and a central member 37a having a detachable portion 37b between outer members 34, 36. Central member 37a and detachable portion 37b collectively serve to separate plastic flows within outer members 34, 36. Detachable portion 37b comprises a plurality of injection ports 32 connecting channel systems 33 to the exterior of nozzle 31 for injection of molten plastic into mold cavities 26, wherein detachable portion 37b has at least two ports 32 for each opening 28 in a single mold 12. Detachable portion 37b is attached to central member 37a with two screws 62, which can be quickly removed so that detachable portion 37b can be replaced with other detachable members (not shown) having alternate designs. Nozzle 31 further comprises valves 63 for purging the nozzle prior to removing detachable portion 37b.

While the embodiments of FIGS. 8, 9, and 12 can be used for injection molding single-colored plastic articles, they are particularly designed for injection molding multi-colored plastic articles, such as laminated lures. For example, as the two separate plastic flows are ejected from ports 32, they converge to form a laminar flow which enters openings 28 and continues through cavities 26. Moreover, the embodiment of FIG. 12 allows nozzle 31 to be quickly modified between different types of laminations, for example, from laminar injection along the mold parting line 29 to laminar injection normal to the mold parting line 29. Further, the embodiment of FIG. 12 accommodates molds having varying number and spacing of mold cavities 26.

Nozzle 31 further comprises a plurality of holes 40 formed therethrough for receiving fasteners (e.g. screws or dowels) to hold the nozzle members together and for attachment of a temperature regulating device, such as the thermocouple driven temperature controller discussed below. Nozzle 31 has machined lips 38 which ride along the peripheral edges of molds 12 and spacers 27 to provide precise alignment of injector ports 32 with mold cavity openings 28. To minimize heat loss from nozzle 31 to molds 12 during sliding contact therewith, as well as to prevent abrasion of the metal surfaces, nozzle 31 is preferably insulated from molds 12 with a layer of a protective material 39, preferably comprising a polymer of tetrafluoroethylene (Teflon), wherein protective material 39 has a plurality of holes 41 formed therethrough through which the molten plastic is injected. Plastic leakage from the nozzle/mold interface is prevented by maintaining a resident force against nozzle 31 in a radial direction towards wheel 11 with pneumatic cylinders 42.

Fused molten plastic is supplied under pressure from a heat exchanger 43 through an injector valve 44, which controls the plastic flow into nozzle 31. Where two or more plastics are used, additional heat exchangers and injector valves will become necessary. The temperature of nozzle 31 and the molten plastic therein is preferably regulated by a thermocouple driven temperature controller (not shown) connected to the nozzle. Nozzle 31 preferably has a minimum capacity of three mold volumes to allow the plastic temperature to be adequately cooled from the temperature required for fusion, which is typically between 325–350° F., to a temperature adequate for injection, typically between 250–280° F. This intercooling feature, along with the short travel distance between nozzle 31 and mold cavities 26, allows precise viscosity control of plastics, thus preventing washing of one color into another color due to low plastic viscosities inherent with elevated temperatures, a feature important for laminating two-colored plastics within the full length of each mold cavity. Where nozzle 31 is designed to carry two or more plastics simultaneously, central member 37 or detachable portion 37b can be designed to serve as a flow controller, for example, by redirecting the plastic flow from injector ports 32 such that either vertical or horizontal laminations can be achieved.

Once mold cavities 26 have been filled with molten plastic, molds 12 are cooled by flowing a liquid coolant, such as water, through a rotating seal fitting 46 into hollow support shaft 13, and into a distribution manifold 47 mounted on wheel 11 for rotation therewith. Flexible lines 48, illustrated in FIG. 5, connect manifold 47 to molds 12 such that a continuous flow of coolant is carried to each mold 12 wherein the coolant flows through passages formed within each mold section 21, 22. Additional flexible lines 48 carry the coolant from molds 12 to a second distribution manifold 49 mounted adjacent first distribution manifold 47, through hollow shaft 13, and out through a second rotating seal fitting 51. Hollow shaft 13 is closed between distribution manifolds 47 and 49.

Figure 10:
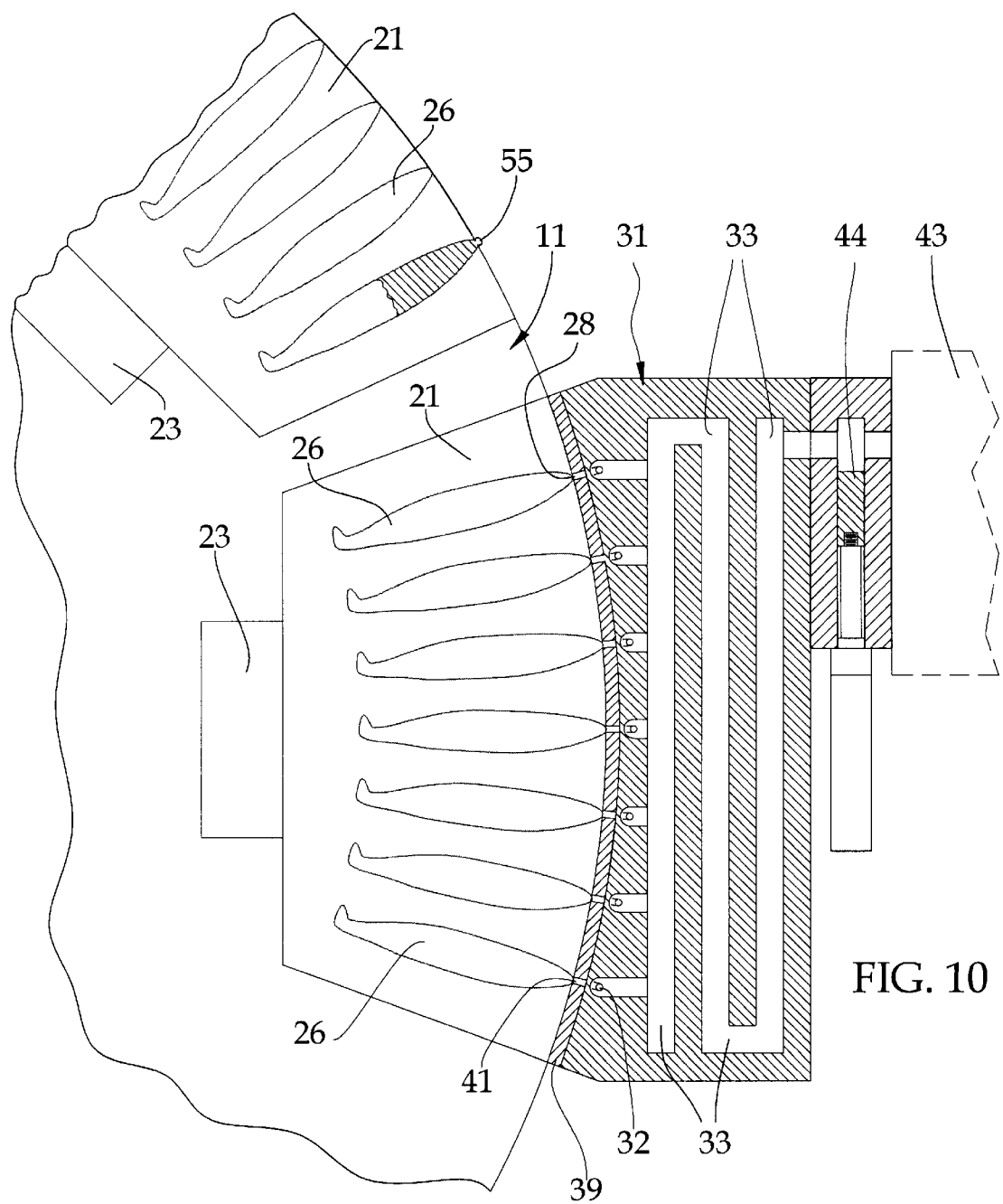
FIG. 10 is a side sectional view of the injection nozzle/mold interface.
Figure 11:
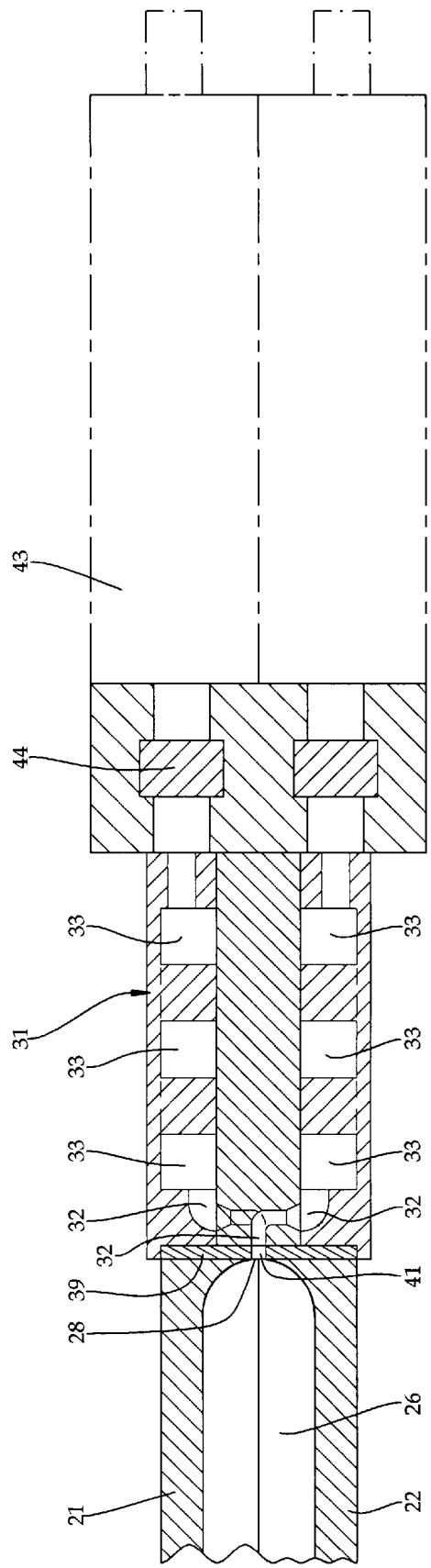
FIG. 11 is a top sectional view of the injection nozzle/mold interface.

In operation, a start switch on the control panel of a central processing unit (not shown) is switched to the "on" position, which starts wheel 11 rotating. Wheel 11 rotates until a sensing device (not shown) detects that a mold 12 is properly aligned with nozzle 31. Two rollers 52, best illustrated in FIG. 5, maintain closure of mold 12 as it enters and exits the injection position to prevent flow reversal from mold cavities 26. Once injector ports 32 and mold cavity openings 28 are precisely aligned, the central processing unit (CPU) activates a brake to stop wheel 11. A plurality of pneumatic cylinders 53 are actuated to firmly clamp the mold in the injection position to prevent opening thereof during injection. Resistance rollers 55 provide an opposing force to cylinders 53 to maintain proper orientation of wheel 11. Injection valve 44 between nozzle 31 and heat exchanger 43 is opened by the CPU and molten plastic is injected into nozzle 31. The partially cooled plastic within nozzle 31 is injected into mold cavities 26 under pressures typically between 5 to 15 psig. Pneumatic cylinders 53 allow mold segments 21 and 22 to slightly separate (e.g. 3¹/₁₀₀₀ inch) as molten plastic is injected into mold cavities 26, thus allowing a slight excess of plastic to be injected. A caliper clamp 54 is also actuated to clamp the most recently injected mold during its tenure in the next position to assure mold closure during the critical cooling period following mold injection and to maximize product cooling by maintaining mold/plastic contact. Caliper clamp 54 fully closes the mold, forcing the excess injected plastic through mold gate 28, wherein the excess plastic forms a plastic reservoir bulb 55, illustrated in FIG. 10. As the plastic article cools and contracts, a portion of the excess plastic from reservoir bulb 55 is pulled back into mold cavities 26. Thus, each plastic article has its own reservoir of molten plastic to prevent deformations (e.g. "shrinks") from forming in the plastic article as it cools.

Timing of the injection cycle is controlled by an electronic timer. Injection cycle times are product size dependent and usually range from 5 to 30 seconds. At the end of the timed injection cycle, injector valve 44 closes and the plastic flow ceases, pneumatic cylinders 53 release the injected mold, caliper clamp 54 releases the adjacent mold, the brake releases wheel 11, and wheel 11 rotates to the next position. Wheel 11 continues to rotate as long as the control switch is in the "on" position. A wedge-shaped knife 56 passes over each mold 12 as wheel 11 rotates and removes any excess plastic, thus leaving a smooth surface on the resulting products. The excised plastic, typically less than 1% of the mold volume, is preferably captured in a container (not shown) for recycling or disposal. As wheel 11 continues to rotate, molds 12 are mechanically opened as wheel 11 rotates past a fixed rod 57 mounted on support frame 16 in a manner to engage a fixed arm 58 mounted on the outside of each movable mold section 22. As fixed arm 58 engages rod 57, hinged movable mold section 22 is pivoted open to expose cavities 26 for lure extraction. A rotatable conical brush 59 mounted to support frame 16 is rotated through mold cavities 26 as wheel 11 rotates past to extract the molded articles from cavities 26. Brush 59 is preferably formed from a flexible material, such as an expanded polyurethane foam, to prevent scarring or deformation of the molded articles. As the molded articles are extracted, they are preferably collected on a conveyor (not shown) and carried to another station for packaging or further processing, or in the alternative, the molded articles can be collected directly in a shipping container. Several injection machines are preferably arranged in line over a common conveyor such that molded articles from several machines are collected on the conveyor and carried to a station where they can be packaged for shipping. As wheel 11 continues to rotate, the opened molds are engaged by a spring loaded wheel 61 which closes each mold 12. If any mold 12 is not properly closed, a sensing device alerts the CPU to stop wheel 11 from rotating. The opening and closing of molds 12 preferably occurs within a 25–30 degree arc along the bottom of wheel 11. The machine includes a comprehensive safety mechanism which shuts down the machine and sounds an alarm when the machine has malfunctioned in any way.

A typical injection cycle for a 4 inch lure is about 15 seconds. The time required to move from one position to the next is about 6 seconds. Based on a total injection cycle of 21 seconds, with 7 cavities per mold, the production rate for the present invention is approximately 1200 lures per hour. Historically, the production rate of an equivalent product on conventional molding equipment, using a 40 cavity mold, has been 812 lures per hour. Thus, this example illustrates the increased production seen in the present invention. Further, since the lure ejection position is preferably 270 degrees from the injection position, and there are preferably 9 molds occupying this 270 degree arc, the mold cooling time between injection and ejection is approximately 190 seconds. Typical mold cooling times for conventional injection machines are approximately 90 seconds. Thus, the extended cooling periods allowed by the present invention prevents deformations in lures induced by handling insufficiently cooled lures. Further, as the mold is cooled after rotating from the injection station, the plastic can contract without deforming because molten plastic from plastic reservoir bulb 55 can be drawn back into cavity 26 through cavity openings 28.

Benefits from the present invention include that it is fully automated, thus eliminating the need for an operator to be present. Technicians set up the machine and periodically monitor the operation through attention to lure quality. Significant quality improvements have been achieved in this apparatus by eliminating the need to flow plastic long distances. Since there are no plastic runners, and hence no plastic waste, this apparatus produces a quality product at a lower cost. Solid color, cored, and laminated (horizontal or vertical) lures can be produced without changing the molds. Interchangeability of molds allows a reasonable variety of lure designs to be produced on the same machine simultaneously with the proviso of same colors of plastics. Cooling times have been extended to allow the lures to cool substantially throughout without sacrificing production time. Production rates are typically at least 1.5 times the rates of existing injection machines. Superior quality laminated lures are produced through innovative temperature control of the plastic. Plastic is fused at 325–350° F. in the main heat exchanger and subsequently cooled to 250–280° F. in the nozzle.

It is to be understood that the form of the invention shown is a preferred embodiment thereof and that various changes and modifications may be made therein without departing from the spirit of the invention or scope as defined in the following claims. Further, the present invention is not limited to injection molding of plastic lures, but has application to injection molding of a variety of highly plasticized materials.

Having set forth the nature of the invention, what is claimed is:

1. A machine for molding plastic articles, comprising:
   a) a rotatable wheel supported on a frame;
   b) a plurality of molds mounted on at least one side of said wheel along the periphery thereof, wherein each of said molds comprises a stationary section mounted to said wheel and an opposing pivotally mounted movable section such that said mold is openable radially toward said wheel periphery, wherein each of said molds further comprises at least one cavity formed therein, each said cavity communicating with the exterior of said mold through an opening formed in said mold;
   c) means for injecting molten plastic simultaneously into each said mold cavity, wherein said injecting means is mounted adjacent said rotatable wheel in a fixed position relative thereto, said injecting means comprising at least one port corresponding to each of said mold openings through which said molten plastic is injected;
   d) means for clamping said stationary section of said mold to said movable section of said mold such that said movable section may be separated from said stationary section such that excess molten plastic may be injected into said cavity;
   e) a source of pressurized molten plastic in communication with said injecting means; and
   f) means for rotating said wheel.

2. A machine according to claim 1, wherein said wheel is substantially vertically disposed.

3. A machine according to claim 1, wherein said wheel is offset from a vertical plane at an angle greater than zero degrees and an angle no greater than twenty degrees.

4. A machine according to claim 1, wherein said molds have a shape of a truncated cone with said mold sections pivotally attached at the truncated edge.

5. A machine according to claim 1, wherein said openings extend radially through said mold along a mold parting line formed between said mold sections.

6. A machine according to claim 1, wherein said openings through said mold are between about 0.010 to about 0.015 inch in length.

7. A machine according to claim 1, wherein said openings through said mold are between about 0.125 to about 0.1875 inch in diameter.

8. A machine according to claim 1, further comprising means for removing plastic from the exterior of said molds along the periphery thereof, said removing means mounted on said frame adjacent said wheel.

9. A machine according to claim 8, wherein said removing means comprises a spring loaded knife, wherein said knife is urged against the periphery of said molds to excise plastic therefrom as said wheel is rotated.

10. A machine according to claim 1, further comprising means for opening said molds.

11. A machine according to claim 10, wherein said opening means comprises an elongated rod mounted to said frame and an arm mounted to each movable section of said molds such that said arm engages said rod as said wheel is rotated thereby to pivotally open each of said molds.

12. A machine according to claim 10, further comprising means for extracting molded plastic articles from said mold cavities after each of said molds have been opened, wherein said extracting means is mounted to said frame to extract the plastic articles from each mold as said wheel is rotated thereby.

13. A machine according to claim 12, wherein said extracting means comprises a rotatable brush.

14. A machine according to claim 13, wherein said brush comprises polyurethane foam.

15. A machine according to claim 10, further comprising means for closing said molds.

16. A machine according to claim 15, wherein said closing means comprises a spring loaded roller mounted to said frame, wherein said roller is urged against said movable sections as said wheel is rotated to close said molds.

17. A machine according to claim 1, further comprising means for cooling said molds.

18. A machine according to claim 17, wherein said cooling means comprises a plurality of hoses connecting channels formed through each of said molds with a remote source of coolant, wherein said coolant is continuously cycled through said hoses and said mold channels.

19. A machine according to claim 18, wherein said molds are comprised of a conductive material.

20. A machine according to claim 19, wherein said conductive material is aluminum.

21. A machine according to claim 1 wherein said means for flexibly clamping said stationary section of said mold to said movable section of said mold comprises at least one pneumatic cylinder.

22. A machine according to claim 1 further comprising:
   a mold gate positioned in said mold; and
   a caliper clamp to force said movable section of said mold to engage said stationary section of said mold;

wherein said excess molten plastic will traverse said mold gate to form a reservoir bulb when said caliper clam forces said movable section to engage said stationary section;

wherein said reservoir bulb provides molten plastic in said cavity as said molten plastic cools.

23. An apparatus for injecting molten plastic iteratively into a plurality of advancing molds, each mold having at least one cavity formed therein, wherein each said cavity communicates directly with the exterior of said mold through an opening formed in said mold, said apparatus comprising a housing having a channel formed therein for carrying molten plastic from a source of pressurized molten plastic to a plurality of ports formed in said housing for injecting said molten plastic simultaneously into each of said mold cavities of an individual mold through said mold openings, wherein said housing comprises at least one port corresponding to each of said mold openings, said apparatus further comprising means for insulating said housing from said molds including a strip of tetrafuoroethylene polymer having a plurality of holes formed therethrough such that said plastic is injected from said housing ports through said holes in said insulating means into said mold openings.

24. An apparatus according to claim 23, further comprising means for regulating the temperature of said housing and said molten plastic therein such that the temperature of said plastic can be raised or lowered.

25. An apparatus according to claim 23, wherein said housing has formed therein a channel for carrying molten plastic and a plurality of ports through which said plastic is injected into said mold cavities through said mold openings.

26. An apparatus for injecting molten plastic iteratively into a plurality of advancing molds, each mold having a plurality of cavities formed therein, wherein each of said cavities communicates directly with the exterior of said mold through an opening formed in said mold, said apparatus comprising a housing having a channel formed therein for carrying molten plastic from a source of pressurized molten plastic to a plurality of ports formed in said housing for injecting said molten plastic simultaneously into each of said mold cavities of an individual mold through said mold openings, wherein said housing comprises at least one port corresponding to each of said mold openings, wherein said housing additionally comprising two opposing members, each of said members having a channel formed therein for carrying molten plastic, and a central member juxtaposed between said opposing members, wherein said central member separates said channels in said opposing members, said central member having a plurality of ports formed therein through which said plastic is injected from said opposing members into said mold cavities through said mold openings.

27. An apparatus according to claim 26, wherein said central member comprises at least two ports corresponding to each of said mold openings for injecting said molten plastic therethrough.

28. An apparatus according to claim 27, wherein said central member has a detachable portion in which said plurality of ports are formed.

29. A machine for molding plastic articles, comprising:
a rotatable wheel supported on a frame;
a plurality of molds mounted on at least one side of said wheel along the periphery thereof, wherein each of said molds comprises a stationary section mounted to said wheel and an opposing pivotally mounted movable section such that said mold is openable radially toward said wheel periphery, wherein each of said molds further comprises a plurality of cavities formed therein, each of said cavities communicating with the exterior of said mold through an opening formed in said mold, wherein said molds have a shape of a truncated cone with said mold sections pivotally attached at the truncated edge;
means for injecting molten plastic simultaneously into each of said mold cavities of an individual mold, wherein said injecting means is mounted adjacent said rotatable wheel in a fixed position relative thereto, said injecting means comprising at least one port corresponding to each of said mold openings through which said molten plastic is injected;
a source of pressurized molten plastic in communication with said injecting means; and
means for rotating said wheel.

30. A machine for molding plastic articles, comprising:
a rotatable wheel supported on a frame;
a plurality of molds mounted on at least one side of said wheel along the periphery thereof, wherein each of said molds comprises a stationary section mounted to said wheel and an opposing pivotally mounted movable section such that said mold is openable radially toward said wheel periphery, wherein each of said molds further comprises a plurality of cavities formed therein, each of said cavities communicating with the exterior of said mold through an opening formed in said mold;
means for injecting molten plastic simultaneously into each of said mold cavities of an individual mold, wherein said injecting means is mounted adjacent said rotatable wheel in a fixed position relative thereto, said injecting means comprising at least one port corresponding to each of said mold openings through which said molten plastic is injected;
a source of pressurized molten plastic in communication with said injecting means;
means for rotating said wheel; and
means for removing plastic from the exterior of said molds along the periphery thereof, said removing means mounted on said frame adjacent said wheel.

31. A machine according to claim 30, wherein said removing means comprises a spring loaded knife, wherein said knife is urged against the periphery of said molds to excise plastic therefrom as said wheel is rotated.

32. A machine for molding plastic articles, comprising:
a rotatable wheel supported on a frame;
a plurality of molds mounted on at least one side of said wheel along the periphery thereof, wherein each of said molds comprises a stationary section mounted to said wheel and an opposing pivotally mounted movable section such that said mold is openable radially toward said wheel periphery, wherein each of said molds further comprises a plurality of cavities formed therein, each of said cavities communicating with the exterior of said mold through an opening formed in said mold;
means for injecting molten plastic simultaneously into each of said mold cavities of an individual mold, wherein said injecting means is mounted adjacent said rotatable wheel in a fixed position relative thereto, said injecting means comprising at least one port corresponding to each of said mold openings through which said molten plastic is injected;
a source of pressurized molten plastic in communication with said injecting means;
means for rotating said wheel; and means for opening said molds comprising an elongated rod mounted to said frame and an arm mounted to each movable section of said molds such that said arm engages said rod as said wheel is rotated thereby to pivotally open each of said molds.

33. A machine according to claim 32, further comprising means for extracting molded plastic articles from said mold cavities after each of said molds have been opened, wherein said extracting means is mounted to said frame to extract the plastic articles from each mold as said wheel is rotated thereby.

34. A machine according to claim 33, wherein said extracting means comprises a rotatable brush.

35. A machine for molding plastic articles, comprising:

a rotatable wheel supported on a frame;

a plurality of molds mounted on at least one side of said wheel along the periphery thereof, wherein each of said molds comprises a stationary section mounted to said wheel and an opposing pivotally mounted movable section such that said mold is openable radially toward said wheel periphery, wherein each of said molds further comprises a plurality of cavities formed therein each of said cavities communicating with the exterior of said mold through an opening formed in said mold;

means for injecting molten plastic simultaneously into each of said mold cavities of an individual mold, wherein said injecting means is mounted adjacent said rotatable wheel in a fixed position relative thereto, said injecting means comprising at least one port corresponding to each of said mold openings through which said molten plastic is injected;

a source of pressurized molten plastic in communication with said injecting means;

means for rotating said wheel; and means for closing said molds comprising a spring loaded roller mounted to said frame, wherein said roller is urged against said movable sections as said wheel is rotated to close said molds.

* * * * *